May 1, 1962 B. W. GUSTAFSON 3,031,835
RAKE TOOTH MOUNTING MEANS
Filed Dec. 18, 1959
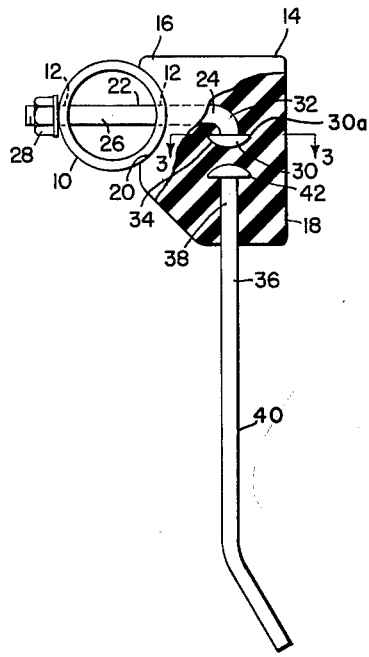
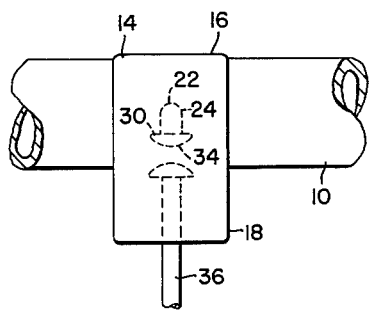
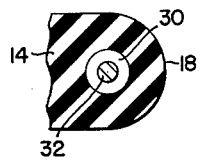
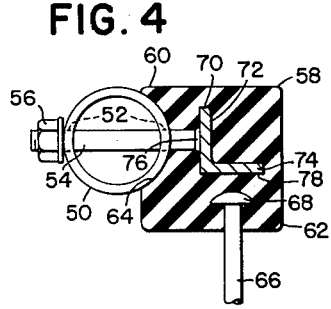
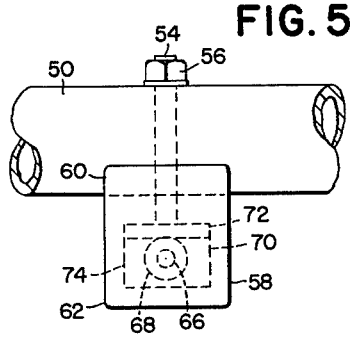
*INVENTOR.*
B. W. GUSTAFSON

3,031,835
RAKE TOOTH MOUNTING MEANS
Blaine W. Gustafson, Ottumwa, Iowa, assignor to Deere & Company, Moline, Ill., a corporation of Delaware
Filed Dec. 18, 1959, Ser. No. 860,541
6 Claims. (Cl. 56—400)

This invention relates to a rake tooth means particularly adapted for use in the type of agricultural implement known as a side-delivery rake or its equivalent.

The general object of the invention is to provide an improved rake tooth means and mounting therefor, particularly one that replaces the conventional all-metal type now in use. More specifically, the invention features the utilization of a mounting means including a block of rubber or similar elastomer material having spaced apart portions, one of which constitutes a mounting portion and engages the rake bar and the other of which is a carrier portion from which the rake tooth projects. The invention features the utilization of mounting means including a metal mounting element projecting from the first-mentioned portion and engaging the bar whereby the block is rigidly mounted on the bar so that the rake tooth projects from the other portion of the block, the block affording yieldability primarily in bending while subjected to normal loads. The advantage of the rubber block is that it will not take a permanent set because of extreme or abnormal conditions, such as when the tooth is abnormally deflected laterally, as by jumping over an adjacent stripper bar.

The foregoing and other advantages and features inherent in and encompassed by the invention will become apparent as preferred embodiments thereof are disclosed in detail in the ensuing specification and accompanying sheet of drawings, the several figures of which are described below.

FIG. 1 is an end view, partly in section, of one form of rake tooth mounting.

FIG. 2 is a rear elevational view of the structure shown in FIG. 1.

FIG. 3 is a fragmentary section on the line 3—3 of FIG. 1.

FIG. 4 is a view similar to FIG. 1 but showing a modified mounting means.

FIG. 5 is a plan of the structure shown in FIG. 4.

The present disclosure is based on the familiarity of those skilled in the art with side-delivery rakes and equivalent implements and therefore such rake in its entirety is not illustrated. However, the numeral 10 represents a typical rake bar, which is commonly constructed of steel tubing. It is also conventional practice to provide such bar or pipe with a plurality of diametrically alined openings by means of which the rake teeth may be mounted. In the present case, one pair of such openings is shown at 12, 12. Those familiar with the art in general will appreciate that the conventional rake tooth comprises one or more coils from which a tine or tooth projects, and the coils are connected in one way or another to the rake bar, such as shown at 10 here, with the tines projecting generally normal to the length of the bar.

It is a feature of the present invention that the conventional coils are eliminated and instead there is used a mounting block 14 of rubber or equivalent elastomer material. This block is here provided with first and second angularly related portions 16 and 18, the former of which is provided with a mounting surface 20, appropriately contoured to nest with whatever external shape is presented by the rake bar or pipe 10. In the present case, the surface 20 is concave because the pipe is round.

The mounting of the block on the rake bar 10 is effected by means including the portion 16 and its surface 20, plus a mounting element 22, here of relatively rigid material, such as steel, which is of course different from the material of which the block 14 is made. The element 22 has an inner part 24 embedded in the block and an outer extension 26 which passes through the rake bar openings 12 and receives fastening means such as a nut 28 for securely mounting the block to the bar.

In this form of the invention, the element 22 takes the form of a relatively elongated steel bolt having a head 30, and the bolt is bent to provide a bent portion at 32 so that the inner part constitutes L-shaped means in which a short portion of the bolt is at right angles to the length of the extension 26 of the bolt. Additionally, the head 30 provides an undersurface 34 which, although shown as being convex, may be regarded as generally transverse to and of greater area than the bent portion 32 of the bolt element 22. Stated otherwise, a portion of the head 30, as at 30a, is generally in a plane parallel to the axis of the bolt extension 26, and the face or surface 34 presented by the underside of the head 30 is directed toward the block portion 18, for reasons to presently appear.

The block 14 carries an elongated tooth element 36 which is generally normal or perpendicular to the length of the bolt element 22. The tooth has an inner part 38 embedded in and projecting from the portion 18 of the block, the external portion of the tooth being regarded as an extension 40 having a lower or terminal bent end which by itself is largely conventional. The inner part 38 is headed at 42 to provide means of increased area as respects the cross-section of the extension 40, and this means of increased area is juxtaposed as respects the means of increased area afforded by the head 30 of the bolt element 22, the two faces thus provided being spaced apart in the direction of the length of the tooth. The spaced apart relation of the two heads 30 and 42 enables the inter-position of material of the block between the two faces, and the block is capable of yielding in bending in this area as forces are applied to the tooth 36 in directions normal to the length thereof. Furthermore, should the tooth be subjected to column loading, as from below, the head 42, providing an increased area, prevents the tooth being pushed vertically through the block. Although the tooth is unlikely to be subjected to tensional forces, or forces in a downward direction, nevertheless the increased area afforded by the head 42 would prevent the tooth from being pulled out of the block. Since the same type of forces would affect the relationship between the embedded part 24 of the bolt 22, the head 30 serves a similar purpose; that is, it affords an area of increased dimensions for improving the connection between the block and the element.

Substantially the same principles as discussed above are achievable in that form of the invention shown in FIGS. 4 and 5 wherein, for purposes of clarity, the rake bar is designated by the numeral 50 and has a pair of diametrically alined openings 52 for receiving a bolt or mounting element 54 corresponding generally to that shown at 22 in FIGS. 1, 2 and 3. The bolt 54 has at its terminal end a nut 56 which affords fastening means for securing the bolt to the bar, along with a mounting block 58 of rubber or equivalent elastomer material. Here again, the block has angularly related portions 60 and 62, the former of which affords a mounting surface 64 for nesting with the bar 50 in the manner described above in connection with the mounting portion 20. A rake tooth 66, similar to that at 36, projects from the other portion 62 so that the two elements 54 and 66 are angularly related, the former projecting from the portion 60 and the latter projecting from the portion 62. The embedded or inner end of the tooth 66 is provided with a head at 68 which serves the same function as the head 42 described above.

One distinction between this form of the invention and that shown in FIGS. 1, 2 and 3 is that the L-shaped means on the inner or embedded part of the bolt 54 is here comprised by an L-shaped member 70 having a pair of angularly related flanges 72 and 74. One of these flanges is rigidly secured to the inner end of the bolt 54, as by welding at 76, and the other flange 74 presents an undersurface 78 of increased area as respects the cross-section of the bolt 54. The surface 78 and the head 68 of the tooth 66 are related in the same manner as the corresponding components 30 and 42 in FIG. 1 and perform the same functions.

In either case, the mounting elements (22 or 54) and the rake teeth (36 or 66) are pre-formed, headed or provided with the angle member 70, as the case may be. A pair of properly angularly related elements are held in an appropriate fixture or jig in connection with a mold in which the elastomer block (14 or 58) is formed. After the block is set up, the mounting and rake tooth elements will project therefrom and will be rigidly secured thereto by being embedded therein. In each case, the improvement affords a rake tooth mounting of relatively low cost compared to its long life, and either design may be provided as original equipment or may be furnished to replace conventional rake teeth already in the field.

Features and advantages other than those enumerated herein will readily occur to those versed in the art, as will many modifications and alterations in the preferred embodiments disclosed, all of which may be achieved without departure from the spirit and scope of the invention.

What is claimed is:

1. Rake tooth means adapted for mounting on a rake bar, comprising: a mounting block of elastomer material having first and second angularly related portions, said first portion having a mounting surface engaging the bar; a mounting element of rigid material other than that of the block and having an inner part embedded in the block and an outer extension projecting from the block generally perpendicular to said mounting surface and extending across the bar and having fastening means cooperative therewith to secure the block to the bar, said inner part having rigid thereon an L-shaped means of increased area as respects the cross-section of said outer extension and presenting a face transverse to the aforesaid mounting surface and directed toward the second portion of the block; and an elongated rake tooth of relatively rigid material having an inner part embedded in the second portion of the block and a rigid extension projecting from said second portion normal to the extension of the mounting element, said inner part of the tooth being spaced away from the face of the L-shaped means in the direction of the length of said tooth.

2. The invention defined in claim 1, including: means on said inner part of the tooth of increased area as respects the cross-section of the tooth and presenting a face toward said face of the L-shaped means.

3. The invention defined in claim 1, in which: the mounting element is a bolt having a head, said head is the embedded inner part, and said bolt is bent adjacent to its head to form said L-shaped means and the end of said head affords said face.

4. The invention defined in claim 1, in which: the mounting element is a rod-like member and the L-shaped means is a rigid member of L-shaped section having a pair of angularly related legs, one of said legs being normal to and rigidly secured to the rod-like member and the other leg affording said face.

5. Rake tooth means adapted for mounting on a rake bar, comprising: a mounting block of elastomer material having first and second angularly related portions, said first portion having a mounting surface engaging the bar; a mounting element of rigid material other than that of the block and having an inner terminal part embedded in the block and an outer extension projecting from the block generally perpendicular to said mounting surface and extending across the bar and having fastening means cooperative therewith to secure the block to the bar, said inner part having rigid thereon means of increased area as respects the cross-section of said outer extension and presenting a face directed toward the second portion of the block; and an elongated rake tooth of relatively rigid material having an inner terminal part embedded in the second portion of the block and a rigid extension projecting from said second portion normal to the aforesaid face of the mounting element, said inner part of the tooth being spaced away from said face in the direction of the length of said tooth.

6. The invention defined in claim 5, including: means on said inner part of the tooth of increased area as respects the cross-section of the tooth and presenting a face toward said face of the mounting element.

References Cited in the file of this patent

UNITED STATES PATENTS

| | | |
|---|---|---|
| 292,218 | Hall | Jan. 22, 1884 |
| 1,780,748 | Fisher | Nov. 4, 1930 |
| 2,029,064 | Edwards | Jan. 28, 1936 |
| 2,328,121 | Bartek | Aug. 31, 1943 |
| 2,697,905 | Moriarty | Dec. 28, 1954 |
| 2,888,993 | Dunning | June 2, 1959 |
| 2,909,889 | Gustafson | Oct. 27, 1959 |
| 2,931,161 | Johnston | Apr. 5, 1960 |

FOREIGN PATENTS

| | | |
|---|---|---|
| 1,193,150 | France | Apr. 27, 1959 |